United States Patent Office 3,553,253
Patented Jan. 5, 1971

---

3,553,253
ENERGETIC POLYNITRO-HALOGENATED AROMATIC ESTERS
Milton B. Frankel, Tarzana, and Gerald L. Rowley, Albany, Calif., assignors to North American Rockwell Corporation
No Drawing. Filed Feb. 16, 1968, Ser. No. 707,919
Int. Cl. C07c *69/76, 69/80*
U.S. Cl. 260—475
7 Claims

ABSTRACT OF THE DISCLOSURE

Novel, energetic aromatic compounds substituted with an ester moiety that is terminated with a dinitrofluoro group, and wherein said aromatic compounds are of the general formula

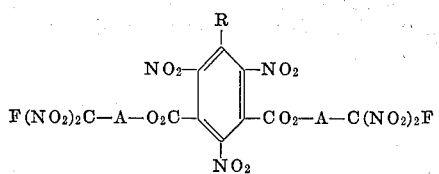

and wherein R is hydrogen, nitro, lower alkyl, or

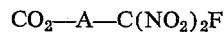

and wherein A is lower alkylene. These compounds are useful as explosives.

BACKGROUND OF THE INVENTION

This invention relates to novel aromatic ester compounds which have utility as explosives. The aromatic compounds of the present invention are characterized by having at least one aliphatic side chain substituted with both nitro radicals and a halogen group joined to the aromatic ring by an ester linkage. The aromatic moiety of the novel compounds may be additionally substituted with alkyl and nitro groups.

More specifically, the compounds of the invention are of the formula (1)
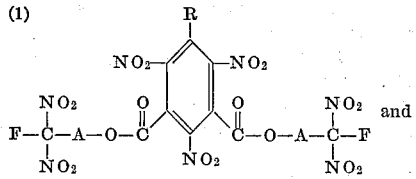

(2)
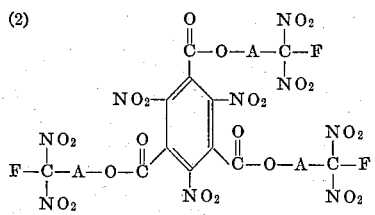

wherein R is a member selected from the group consisting of hydrogen, lower alkyl and nitro, and wherein A is the same or different and is a member selected from the group consisting of straight and branched lower alkylene radicals.

As used in this disclosure, the term straight or branched chain lower alkylene refers to radicals containing 1 to 4 carbon atoms such as 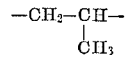, —CH$_2$—CH$_2$—, —(CH$_2$)$_3$—,

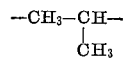

and the like. The alkylene radical can be represented by the general formula C$_n$H$_{2n}$ wherein $n$ is a positive number of 1 to 4 inclusive. Exemplary of lower alkyl groups are the straight or branched chain alkyl radicals having 1 to 4 carbon atoms such as CH$_3$—, CH$_3$—CH$_2$—,

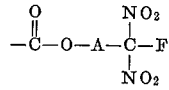

—CH$_2$—CH$_2$—CH$_2$— and the like. The alkyl radical can be represented by the general formula C$_n$H$_{2n+1}$ wherein $n$ is a positive number of 1 to 4 inclusive.

Substituted aliphatic ester side chains within the scope of the invention, conforming to the grouping

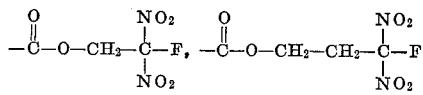

set forth in Formulae 1 and 2 above, are illustrated by the following:

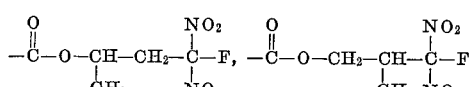

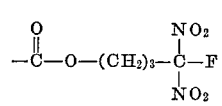

and the like. The presently preferred compounds of the invention are those under Formula 1 above wherein R represents the group CH$_3$— and A represents the group —CH$_2$—; and under Formula 2 above wherein A represents the group —CH$_2$—.

SUMMARY OF THE INVENTION

Briefly, the invention is concerned with novel, energetic compounds of the general formula

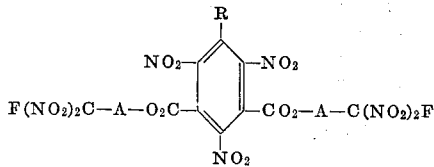

wherein R is H, NO$_2$, CO—A—C(NO$_2$)$_2$F or C$_n$H$_{2n+1}$ wherein $n$ is a whole integer of 1 to 4, and wherein A in the ester moiety CO$_2$—A—C(NO$_2$)$_2$F is C$_n$H$_{2n}$ and wherein said $n$ is a whole integer of 1 to 4.

DESCRIPTION OF THE PREFERRED EMBODIMENTS

The novel compounds of the subject invention as set forth in the formula supra can be synthesized by first preparing a polynitro-aromatic polybasic acid, for example, dibasic and tribasic acids, by the oxidation of trinitromesitylene according to the procedure as set forth in Bull. Soc. Stunte Cluj, vol. 9, pp. 215, 1939, and then refluxing for 5 to 8 hours under normal atmospheric conditions in an anhydrous inert organic medium trinitrotrimesic acid and trinitroisophthalic acid with phosphorous pentachloride to produce the desired 5-methyl-2,4,6-trinitroisophthalyl chloride and 2,4,6-trinitrotrimesoyl chloride. The next step in the synthesis comprises the condensation of a substituted aliphatic alkanol with the polynitro-aromatic polybasic acid chloride to produce the desired compound. The condensation is carried out in an inert organic solvent and in the presence of a suitable catalyst. The present synthesis can be represented by the following equation wherein $R_1$ represents $CH_3$—, or —COOH, $R_2$ represents $CH_3$ or COCl, and $R_3$ represents $CH_3$—, and $CO_2$—A—$C(NO_2)_2F$, wherein A is as described supra

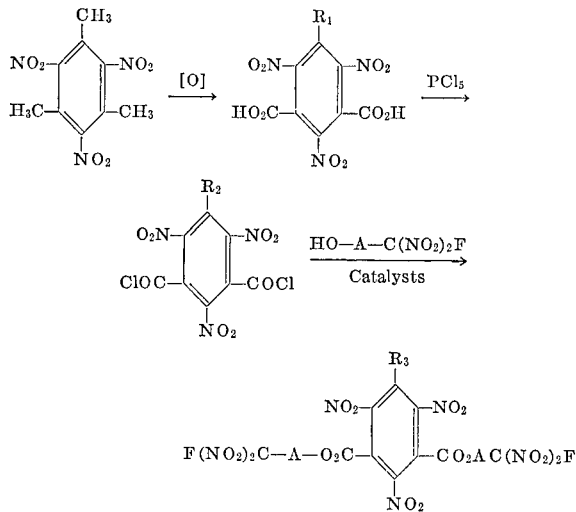

Exemplary of inert solvents suitable for the above reactions are methylene chloride, ethylene dichloride, chloroform, carbon tetrachloride, chlorobenzene, or any other inert solvent that does not adversely affect the reaction.

Typical catalysts suitable for the above general reaction are basic catalysts such as potassium carbonate, pyridine, piperdine, piperazine, triethylamine, trimethylamine and acid catalysts such as aluminum chloride and the like. The amount of catalyst can vary, usually from a trace to stoichiometric amounts. For the preparation of the compounds an excess of catalysts is usually employed, generally about 5 to 10 percent excess. The particular catalysts employed and the amount utilized generally depends on the speed of the reaction desired and is within the skill of the art.

The above discussion is merely illustrative of the mode and manner of carrying out the invention, and it is to be understood that the discussion is not intended to be limited to the instant disclosure, as other techniques may be successfully employed.

The following examples are representative of embodiments of the present invention and these examples are not to be construed as limiting as other obvious embodiments will be readily apparent in view of this disclosure to those versed in the art.

Example I

Preparation of trinitromesitylene: Absolute nitric acid, 375 ml., was cooled to —5° C. and 120 gm. (1 mole) of commercially available mesitylene was added to the acid dropwise in about 2 hours, keeping the temperature between —5 and +5° C. A white solid separated. The reaction mixture was poured on ice. The product was collected, washed well with water and dried. The yield of di and trinitromesitylene was 222 gm., M.P. 82–200° C. A slurry of the product in one liter of concentrated sulfuric acid was cooled to 10° C. and 150 ml. of absolute nitric acid was added dropwise. The mixture was allowed to warm to ambient temperature and stirred for 2 hours. The mixture was poured on ice, the solid collected, washed with water, and dried ni vacuo over potassium hydroxide. The yield of trinitromesitylene was 250 gm. (98 percent), M.P. 200–220° C. Recrystallization from chloroform raised the melting point to 236–238° C.

Example II

Preparation of trinitrotrimesic acid and 5-methyl-2,4,6-trinitroisophthalic acid: 69 grams of potassium permanganate was added in very small portions over a 3 hour period to a vigorously stirred solution of 450 ml. of 14 percent fuming sulfuric acid, 3 ml. concentrated nitric acid, and 15 grams (58.8 moles) of trinitromesitylene maintaining the temperature between —5 and 0° C. The reaction can become violent if addition is too rapid. At the conclusion of the addition, the mixture was allowed to warm by its own exotherm to 35° C. at which time the reaction subsided. The mixture was then heated to 55° C. for one hour, cooled, and drowned on ice. The aqueous solution was extracted 4 times with ether. The combined extracts were dried and concentrated in vacuo giving 9.5 grams (46.8 percent) of crude product. The product was purified by dissolving in base and extracting with ether. The basic solution was then acidified and extracted with ether. The extracts were dried and concentrated to give 6.0 grams of purified acid, M.P. 209.5–211.5° C., which is a mixture of 2,4,6-trinitrotrimesic acid and 5-methyl-2,4,6-trinitroisophthalic acid.

Example III

Preparation of 2,4,6-trinitrotrimesoyl chloride and 5-methyl-2,4,6 - trinitro-isophthalylchloride: First, 25.3 grams of the mixed trinitrotrimesic acid and 5-methyl-2,4,6-trinitroisophthalic acid, as prepared in Example II, and 61.2 grams of phosphorous pentachloride were dissolved in 10 ml. chlorobenzene. The solution turned orange and hydrogen chloride was evolved as the trinitromesic acid was dissolved. Next, the mixture was refluxed under anhydrous conditions for about seven hours during which time the hydrogen chloride evolution had almost ceased. The resulting dark solution was diluted with methylene chloride and washed with three portions each of 5 percent sodium bicarbonate solution and water. It was dried over anhydrous sodium sulfate and the solvent removed under reduced pressure to give a dark gum which was extracted with five portions of boiling heptane and gave 7.19 grams of crude tan plates, M.P. 149.5–152.5° C. Recrystallization from carbon tetrachloride-hexane using charcoal and celite filter aide gave 1.66 grams pale yellow plates, M.P. 164–167° C. Another recrystallization from carbon tetrachloride-hexane gave an analytical sample of 2,4,6-trinitrotrimesoyl chloride, pale yellow plates, M.P. 165.5–168.5° C. decomposition. The calculated elemental analysis for $C_9Cl_3N_3O_9$ was C, 26.99; H, 0.00; N, 10.49. The found analysis was C, 27.28; H, 0.45; N, 10.3. The infrared spectrum for the compound, in Nujol, exhibited maximum peaks at 5.6, 6.4, 7.4, 9.6 and 11.2 microns. The compound 5-methyl-2,4,6-trinitroisophthalyl chloride was isolated from the mother liquor and it exhibited a melting point of 154.5–157.5° C.

Example IV

Preparation of bis(2',2' - dinitro-2' - fluoroethyl)-5-methyl - 2,4,6-trinitroisophthalate: First, 0.5 gram of 5-methyl-2,4,6-trinitroisophthalyl chloride prepared according to the procedures set forth in Example III and 0.64 gram of 2,2-dinitro-2-fluoroethanol were dissolved in 5 ml. methylene chloride and vacuum dried (140° C.) potassium carbonate (2.58 grams) was added in one portion. The potassium carbonate turned brown and the solvent boiled for one minute. Next, the resulting mixture was stirred at room temperature for 2 hours and the potassium carbonate was filtered. After diluting the filtrate with methylene chloride, it was extracted with four portions of water, dried over anhydrous sodium sulfate, evaporated under reduced pressure to give 0.71 gram yellow syrup. Crystallization from ethanol gave pale yellow crystals, M.P. 122.5–127.5° C. A second recrystallization from ethanol gave the analytical sample M.P. 135–137.5° C. The calculated elemental analysis for $C_{13}H_7F_2N_7O_{18}$ was C, 26.54; H, 1.20; N, 16.67. The found analysis was C, 26.32; H, 1.29; N, 16.71. The infrared spectrum for the compound in Nujol, exhibited maximum peaks at 5.7, 6.2, 7.3, 7.4 and 8.3 microns.

Example V

Preparation of tris-(2',2'-dinitro-2'-fluoroethyl)-2,4,6-trinitrotrimesoate: In a similar manner as described in Example IV, 2,4,6-trinitrotrimesoyl chloride was treated with 2,2-dinitro-2-fluoroethanol and potassium carbonate in methylene chloride medium. Work up of the reaction mixture, as hereinbefore described, gave tris-(2',2'-dinitro-2'-fluoroethyl)-2,4,6-trinitrotrimesoate.

The novel compounds of the invention prepared by the above described processes are thermally stable and very energetic. The compound tris-(2',2'-dinitro-2-fluoroethyl)- 2,4,6-trinitrotrimesoate has an explosive power of 117 as compared to trinitrotoluene with an explosive power of 100. The energetic esters of the invention can be used in their pure form for their explosive effects or they can be utilized in admixtures with other explosives like cyclotrimethylene trinitramine, pentaerythritol tetranitrate trinitrotoluene, nitroglycerine, picric acid and the like. The energetic esters and the compositions of matter formed by mixing the compounds with other explosives can be used for many purposes such as ordnance, demolition, oil well shooting, incendiary compositions, quarry blasting and the like.

Obviously, many modifications and variations of the instant invention are possible in the light of the above teachings. It is, therefore, to be understood that within the scope of the disclosure and appended claims, the invention may be practiced otherwise than is specifically described.

We claim:

1. A novel energetic compound of the general formula

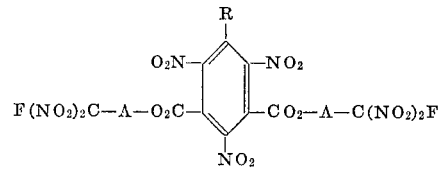

wherein R is a member selected from the group consisting of H, $NO_2$, $CO_2$—A—$C(NO_2)_2F$ and $C_nH_{2n+1}$ wherein $n$ is a whole integer from 1 to 4 and wherein A is $C_nH_{2n}$ and $n$ is a whole integer of from 1 to 4.

2. An energetic compound according to claim 1 wherein R is methyl and the integer of $C_nH_{2n}$ is 1.

3. An energetic compound according to claim 2 wherein said integer is 2.

4. An energetic compound according to claim 1 wherein R is $CO_2$—A—$C(NO_2)_2F$ and the integer of $C_nH_{2n}$ is 1.

5. An energetic compound according to claim 4 wherein the said integer is 2.

6. Bis(2',2'-dinitro-2'-fluoroethyl) - 5 - methyl-2,4,6-trinitroisophthalate.

7. Tris - (2',2' - dinitro - 2'-fluoroethyl) - 2,4,6-trinitrotrimesoate.

References Cited

UNITED STATES PATENTS 3,387,044   6/1968   Grakauskas et al. ___ 260—644

LELAND A. SEBASTIAN, Primary Examiner

U.S. Cl. X.R.

149—105